US008748679B2

(12) United States Patent
Fiato

(10) Patent No.: US 8,748,679 B2
(45) Date of Patent: Jun. 10, 2014

(54) SYNTHETIC FLUIDS AND METHODS OF MANUFACTURE

(75) Inventor: Rocco A. Fiato, Basking Ridge, NJ (US)

(73) Assignee: Accelergy Corporation, Houston, TX (US)

( * ) Notice: Subject to any disclaimer, the term of this patent is extended or adjusted under 35 U.S.C. 154(b) by 90 days.

(21) Appl. No.: 12/767,686

(22) Filed: Apr. 26, 2010

(65) Prior Publication Data

US 2011/0263914 A1 Oct. 27, 2011

(51) Int. Cl.
C07C 1/00 (2006.01)
C10M 105/04 (2006.01)

(52) U.S. Cl.
USPC .......... 585/240; 585/1; 585/14; 44/300; 507/103; 507/203

(58) Field of Classification Search
USPC .......................................... 585/240
See application file for complete search history.

(56) References Cited

U.S. PATENT DOCUMENTS

| 5,635,457 | A | 6/1997 | Van Slyke |
| 5,958,845 | A | 9/1999 | Van Slyke |
| 6,096,690 | A | 8/2000 | Wittenbrink et al. |
| 6,284,714 | B1 | 9/2001 | Bland et al. |
| 6,392,109 | B1 | 5/2002 | O'Rear et al. |
| 7,148,183 | B2 | 12/2006 | Quintero |
| 7,888,540 | B2 * | 2/2011 | Deluga et al. ............ 585/14 |
| 7,968,757 | B2 * | 6/2011 | Abhari et al. ............ 585/240 |
| 7,998,339 | B2 * | 8/2011 | Myllyoja et al. ......... 208/18 |
| 8,022,258 | B2 * | 9/2011 | Myllyoja et al. ......... 585/240 |
| 8,026,401 | B2 * | 9/2011 | Abhari et al. ............ 585/240 |
| 2007/0161832 | A1 * | 7/2007 | Myllyoja et al. ......... 585/7 |
| 2009/0069610 | A1 * | 3/2009 | Roberts et al. .......... 585/24 |
| 2009/0229172 | A1 * | 9/2009 | Brady et al. ............. 44/307 |
| 2009/0247799 | A1 * | 10/2009 | Myllyoja et al. ........ 585/240 |
| 2009/0283442 | A1 * | 11/2009 | McCall et al. ........... 208/15 |
| 2009/0287029 | A1 * | 11/2009 | Anumakonda et al. ... 585/16 |
| 2010/0145114 | A1 * | 6/2010 | Abhari et al. ........... 585/1 |
| 2010/0151112 | A1 * | 6/2010 | Franklin et al. .......... 426/656 |
| 2010/0151535 | A1 * | 6/2010 | Franklin et al. .......... 435/128 |

FOREIGN PATENT DOCUMENTS

WO   WO 2009/025663   * 2/2009

* cited by examiner

Primary Examiner — Ellen McAvoy
(74) Attorney, Agent, or Firm — Kevin McMahon

(57) ABSTRACT

A method for producing synthetic fluids from TGFA's harvested from genetically modified seed crops in which all of the fatty acids in the TGFA's from the seeds of a crop have the same carbon atom chain length, preferably C12 or C14, and the synthetic fluids produced by the method. The TGFA's are hydroprocessed to cleave the fatty acids from the glycol backbone and to hydrodeoxygenate and isomerize the fatty acids to form single carbon chain length isoparaffins having a controlled degree of branching with minimum cracking. Controlled mixtures of hydrocarbon components, in which each hydrocarbon component of the mixture has a different single carbon atom chain length, are produced. The relative ratios of the single carbon atom number hydrocarbons in the mixture are selected to optimize the characteristics of the synthetic fluid product for a given application, if the end product is an SDF, the severity of the hydrotreatment is controlled such that the degree of cracking is minimized and the isomers generated are primarily monomethyl isoparaffins. If the end product is a jet fuel blend stock, the hydrotreatment is somewhat more severe in order to generate multiple branched isomers that have improved aerobic biodegradability and low temperature properties. The degree of hydrotreatment is controlled to limit the degree of branching in order to preserve the required thermal and oxidative stability properties, and to minimize cracking.

18 Claims, 1 Drawing Sheet

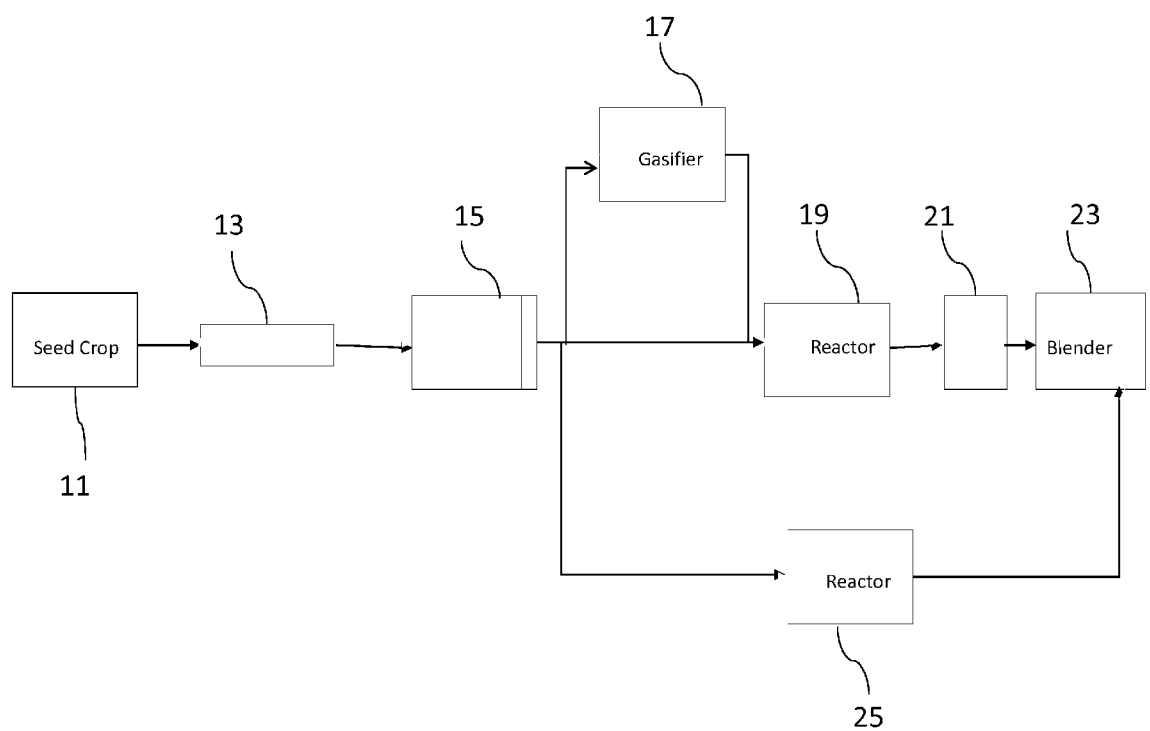

SYNTHETIC FLUIDS AND METHODS OF MANUFACTURE

This invention relates generally to synthetic fluids, such as synthetic base drilling fluids and aviation fuel blend stocks, having a lower carbon footprint and methods for producing them, and more particularly to such synthetic fluids produced from biological sources.

BACKGROUND

Recent studies by ExxonMobil, Shell and Unocal have shown the benefits of synthetic base drilling fluids (SDF's) in the evolution of environmentally friendly replacements for petroleum derived analogs. Essentially all commercial current day drilling fluid formulations are based on refinery extraction, severe hydrotreatment, by partly polymerizing linear olefins to produce low molecular weight linear alpha olefins, or by other olefin oligomerization and/or condensation reactions, Fischer-Tropsch synthesis, and various transesterification reactions of natural fatty acids with alcohol streams. Important characteristics of SDFs include their viscometric and volatility characteristics, toxicity and biodegradability. Current SDFs are discussed in a recent report by Shell appearing at: http://www.shell.com/home/content/chemicals/products_services/our_products/alpha_olefins_detergent_alcohols/neoflo/synthetic_drilling_fluids_defined/neoflo_synthetic_fluids.html.

The term "synthetic" as it applies to fluids herein, generally refers to materials that are not normally found in nature, and that are manufactured by chemical processes, as opposed to being extracted from refinery streams, which extracted streams are generally referred to as being "petroleum-based." Typical SDF's have been internal olefins, alpha olefins, polyalphaolefins, paraffins, esters and blends of these materials. These fluids offer improved lubricity, thermal stability, and well-bore integrity. Formulated synthetic drilling fluids are typically made up of about 60 to 80% of an SDF, about 10 to 15% of emulsifier and surfactant components, and inorganic fillers such as alumina or silica.

The environmental properties of base fluids depend on the physical and chemical characteristics of the material. Olefin and paraffin base fluids and diesel will biodegrade aerobically. However, under anaerobic conditions, alpha olefin and internal olefin base fluids biodegrade more extensively (>50%) than paraffins and diesel (<5-20%). As a result, paraffin base fluids may persist in the environment for longer periods of time if they are not exposed to aerobic conditions. Ideally, base drilling fluids should be biodegradable under both aerobic and anaerobic conditions.

Important characteristics of aviation fuel blend stocks, especially for jet fuels, include theft low temperature properties, oxidative and thermal stability, energy content, and system compatibility, including effects on metal corrosion and integrity of seals and gaskets, toxicity and biodegradability. With today's increasing environmental concerns, the greenhouse gas lifecycle analysis (LCA) has become an important characteristic of aviation fuels. It is extremely difficult or impossible to obtain a favorable balance of all of these characteristics with current petroleum derived aviation fuels. For example, such aviation fuel blend stocks or typically contain significant amounts of poly-nuclear aromatics and complex polyunsaturates that are toxic to humans and animals.

International patent application publication number WO 2009/025663 A1 describes processes for producing jet fuel blend stocks from biologically produced triglyceride fatty acids (TGFA's) obtained from medium chain length TGFA's, such as cuphea, in which the fatty acid groups have no more than 16 carbon atoms, by cleaving the medium chain fatty acid groups from the glycerides and decarboxylating and isomerizing the fatty acids to form hydrocarbons for the production of jet fuel. The disclosed method attempts to mimic the molecular weight distribution of typical jet fuels, such as JP 8, by blending oils from various biologic TGFA's. It is difficult or impossible, however, to precisely control the degree of cracking and isomerization of the various carbon chain length molecules in the fatty acids, thereby compromising the properties of the produced or jet fuel blend stock. The disclosure of WO 2009/025663 A1 is hereby incorporated by reference in its entirety for all purposes.

SUMMARY OF THE INVENTION

In accordance with the present invention, there has been discovered a new and low cost method for producing novel synthetic fluids, including SDF's and aviation fuel blend stocks, from biologically produced TGFA's. The TGFA's are harvested from seed crops that have been genetically modified such that all of the fatty acids in the TGFA's from the seeds of a particular crop have the same carbon atom chain length, preferably, C12 or C14. The TGFA's containg fatty acids having a given carbon chain length are hydroprocessed in one or more processing stages to cleave the fatty acids from the glycol backbone and to hydrodeoxygenate and isomerize the fatty acids to form isoparaffins having a controlled degree of branching with minimum cracking. Preferably, the TGFA's are first hydrolyzed to cleave the fatty acids from the glycol backbone before the hydroprocessing step. The synthetic fluids a comprise controlled mixture of hydrocarbons in which each hydrocarbon component of the mixture is produced froma sperate TGFA containg feed, preferably a genetically modified seeds in which substantially all of the fatty acids in the TGFA's of the seeds have a single carbon atom chain length, preferably C12 or C14, and the single carbon atom chain length of the fatty acid used to produce a firat hydrocarbon component is different from the single carbon atom chain length of the fatty acid used to produce a second hydrocarbon component. Thus, after hydrodeoxygenation and isomerization, substantially all of the hydrocarbons in a component of the synthetic fluid will contain the same number of carbon atoms that is different from the number of carbon atoms of substantially all of the hydrocarbons in a second component of the synthetic fluid. The relative ratios of the single carbon atom number hydrocarbons in the mixture are selected to optimize the characteristics of the synthetic fluid product for a given application. If the end product is an SDF, the severity of the hydrotreatment of each component is preferably controlled such that the degree of cracking is minimized and the isomers generated are primarily monomethyl isoparaffins. If the end product is to be a jet fuel blend stock, the hydrotreatmentof each component is preferably somewhat more severe in order to generate multiple branched isomers that have improved aerobic biodegradability and low temperature properties. The degree of hydrotreatment of each component must be controlled, however, to limit the degree of branching in order to preserve the required thermal and oxidative stability properties, and to minimize cracking.

BRIEF DESCRIPTION OF THE DRAWINGS

FIG. 1 of the drawings is a schematic flow plan that includes an embodiment of the process of the invention for producing SDF's.

DETAILED DESCRIPTION OF SPECIFIC EMBODIMENTS

The seed crops used to produce the novel synthetic fluids of the invention are genetically modified in such a way that the fatty acids in the TGFA's of the seeds are all of the single carbon chain length, preferably C12 or C14. In a preferred embodiment of the method of invention, the seed crop used to produce the TGFA's matures rapidly and can be temporally interspersed where the successive plantings of another crop, such as a food crop. Both genetically modified camelina and cranbee are rapidly growing seed crops that can be excellent sources of TGFA's in the desired carbon chain lengths. Advantageously, they can be produced in rotation with traditional food crops, such as wheat, to maximize the $CO_2$ consumption rate of a given acre of land. Moreover, they enhance the productivity of the food crop cycle by increasing the permeability and $CO_2$ adsorption properties of the soil, and, at least in the case of camelina, improving the soil, such that the productivity of the following wheat crop is increased. The cellulosic material that remains after the TGFA's in the seeds are isolated from the crop can be gasified to produce syngas to supply hydrogen for later hydroprocessing steps.

Genetically modified camelina is a particularly preferred seed crop for use in the present invention because it goes from planting of the seeds to harvest within 90 days, requires minimal water, and does well in semi-arid soils. Also, the residual cellulosic material can be used as an animal fodder. The method of the invention is especially advantageous from environmental point of view because it is capable of achieving a net negative greenhouse gas footprint. The extent to which it is negative will depend on the specific seed crop used, the amount of fertilizer and water needed to grow the crop, and the impact on the and being used versus what it was being used for before the seed crop was planted.

The genetic modification of the seed crops such as camelina and cranbee to have single carbon chain length fatty acids may be performed by any method known to those skilled in the art. Techniques capable of performing such genetic modifications are disclosed e.g., in international applications WO/2009/125401, WO/2009/109054, WO/2009/147127 or WO/2009/129582, the disclosures of which are hereby incorporated by reference in their entirety for all purposes.

The TGFA's are normally extracted from the seed crop by crushing and pressing or other conventional techniques. Alternatively, methods such as super critical extraction, treatment with microwave radiation to cause the plant cellulosic structure to disintegrate and then isolating the oily residue by extraction or centrifigugation may be employed. The particular methods by which fatty acids are cleaved from the TGFA's and processed to produce to desired hydrocarbon products do not form part of the present invention, and can be performed by conventional methods.

In one illustrative procedure, the fatty acids are cleaved using a thermochemical process in which the TGFA's or heated in an aqueous acidic solution or an aqueous basic solution, preferably in the presence of a catalyst. One such thermochemical process for cleaving fatty acids from a glycerol backbone is described in Myllyoja et al, U.S. patent application Ser. No. 11/477,922 ("Myllyoja"), which is hereby incorporated by reference in its entirety for all purposes. In one embodiment, the cleavage process involves a decarboxylation reaction as described in Myllyoja.

Alternatively, the process may comprise the disassembly of a medium chain fatty acid source from glycerol by decarboxylation of the fatty acid chains while still attached to the glycerol backbone, thus simultaneously cleaving the fatty acid group and producing glycerol and one or more hydrocarbon products. In such case, the hydrocarbon product will be one carbon shorter in chain length than the original fatty acid.

In another embodiment, the fatty acid chains may be reduced while still attached to the glycerol backbone, thereby producing glycerol and the hydrocarbon product, in such case, the hydrocarbon product, prior to isomerization, has the same carbon chain length as the original fatty acid coupled to the TGFA's. The reduction is preferably performed in the presence of hydrogen and any suitable catalyst. In an additional embodiment, the TGFA's may be disassembled by chemical reduction of the glycerol backbone, thereby producing the hydrocarbons and propane, propanol, propanediol or other glycerol-derived products or combinations thereof.

Catalysts suitable for the conversion of TGFA's to normal hydrocarbons include individual metals such as palladium, platinum, nickel, silver, gold, copper, or mixed or promoted metals, such as cobalt-molybdenum or nickel-molybdenum. The catalyst metal or mixed metals may be present on a porous support formed of carbon, silica, alumina, or other materials known to the art. The metal-support combination may be in the form of a particulate or a formed extrudate that may be formed into any 3-dimensional shape. This list is not intended to be inclusive, and other metals many function equally well as those listed here. Catalysts suitable for the isomerizing the normal hydrocarbons include individual metals such as palladium, platinum, nickel, or mixed or promoted metals, such as cobalt-molybdenum or nickel-molybdenum. The conversion and isomerization steps can be performed simultaneously or, preferably, in successive steps.

The conversion of the TGFA's may be performed in the presence of the catalyst at temperatures from about 250° C. to about 350° C., preferably about 280° C. to about 320° C., but more preferably about 300° C. The conversion of the TGFA's is preferably performed in the presence of hydrogen, preferably at a gauge pressure ranging from about 50 psig to about 200 psig, preferably ranging from about 75 psig to about 150 psig, more preferably from about 90 psig to about 125 psig. The catalyst is most preferably prepared for usage by pretreatment with hydrogen, resulting in reduction of the active metal. The reduction of catalyst is performed at an elevated temperature resulting in removal of water during the reduction step.

Alternatively, fatty acids may be cleaved from the glycerol by an enzymatic process such as the process described in U.S. Pat. No. 4,394,445, herein incorporated by reference in its entirety for all purposes, or other biological processes known in the art. Examples of enzymes that may be used include, without limitation, esterases, lipases, proteases, or combinations thereof. As used herein, "biological process" is any process utilizing biological organisms (e.g. bacteria, algae, etc.) to accomplish the desired reaction. In another embodiment, the fatty acids may be cleaved from the glycerol backbone by acid-catalyzed hydrolysis of the glycerides in the TGFA's.

After cleavage of the fatty acids from the glycerol, the glycerol may be separated from the fatty acids. The separation may be accomplished by various conventional methods including, without limitation, liquid-liquid extraction, supercritical solvent extraction, distillation, membrane filtration, acidulation, centrifugation, by gravity separation, or combinations thereof. Once separated from the fatty acids, the separated glycerol may be used for further reforming or other purposes.

If the end product is to be an SDF base fluid, the TGFA's are isolated separately from each genetically modified seed crop, are hydrotreated separately in a conventional manner to cleave the component single length fatty acid chains from the glycol backbone, and to hydrodeoxygenate and isomerize each component fatty acid to generate corresponding component isoparaffins, substantially all of the molecules of each component isoparaffin containing the same number of carbon atoms, preferably between C12 and C14. Isoparaffin components containing different single numbers of carbon atoms are mixed in controlled proportions to form an SDF base fluid having the desired properties, in accordance with the method of the invention, the severity of the isomerization hydrotreatment of each component is controlled such that the degree of cracking is minimized and the isomers generated are primarily monomethyl isomers. To produce the best low temperature properties, it is desirable to eliminate essentially all the linear molecules, especially in those cases when trace levels of C15+ species might be present.

Advantageously, the surfactant and emulsifier components of the fully formulated SDF can optionally also be produced from the TGFA's. For instance, the TGFA's can be hydrolyzed to produce a carboxylic and surfactant component, and can be used directly as the emulsifier component.

If the end of product is to be a jet fuel blend stock, the isomerization hydrotreatment is preferably somewhat more severe in order to generate multiple branched isomers that have improved aerobic biodegradability and low temperature properties. The degree of hydrotreatment of each component must be controlled, however, to limit the degree of branching in order to preserve the required thermal and oxidative stability properties, and to minimize cracking. In general, the isomerization hydrotreatment for each component should be the minimum required to obtain the required low temperature properties, e.g., a freeze point of less than −47° C. in practice, the appropriate degree of hydrotreatment and isomerization for the components of the synthetic fluids of the invention depends on the carbon chain length of the fatty acid and can be determined by simple experimentation. For instance, a series of tests could be run for a given component using different severities of hydrotreatment and the hydrocarbon product produced by each test run would be tested to identify the minimum hydrotreatment conditions that achieve the required freeze point. The optimum conditions will vary from feed to feed, e.g., with the specific carbon chain length of the fatty acid in the TGFA's, and from catalyst to catalyst.

A chemiometric study would be then performed in which the components are mixed in different proportions to determine the optimal mixture or range of mixtures that meet the requirements of the applicable specifications, e.g., ASTM 7566, such as viscometric properties, cloud point and thermal and oxidative stability. Once those conditions are determined, they would be used in the normal production run to generate large scale batches of product. This method provides a self defining approach that maximizes performance for any combination of the variables significant to a given application. The fact that, in accordance with the invention, substantially all of the fatty acids in the TGFA's of a particular feed have the same carbon chain length allows the determination of an optimal set of processing conditions for a given feed that results in a much more precisely controlled product composition than would be possible with a feed containing fatty acids of varying carbon chain lengths.

The novel synthetic fluids produced by the method of the invention are biodegradable under the conditions of use, are non-toxic and fully renewable, and do not require any petroleum based components to function as SDF's or et fuel blend stocks, thereby substantially reducing the overall GHG footprint of the production and use of the synthetic fluids produced by the method of the invention.

The novel synthetic fluids of the invention consist essentially of controlled mixtures of preferably C12-C14 isoparaffins in which the molecules have controlled degrees of branching, and a minimized content of shorter chain molecules resulting from cracking during hydroprocessing. The processing condition for the isoparaffin components of the fluids are preferably controlled such that each of the components, and therefore the blended fluid, is substantially free of poly-nuclear aromatics and complex polyunsaturates. The controlled relative amounts of C12-C14 molecules in the synthetic fluids of the invention result in fluids having optimal combinations of properties for a given application such as SDFs or aviation fuels. The fact that the fluid is substantially free of poly-nuclear aromatics and complex polyunsaturates enables them to pass rigorous applicable governmental and regulatory anti pollution requirements such as those contained in the US Environmental Protection Agency National Pollutant Discharge Elimination System Permitting Program, 40 CFR Part 405-471.

Referring now to the FIGURE, there is illustrated a schematic flow plan of an embodiment of the process of the present invention for producing SDF's. The seed crop 11, which is to supply a single carbon atom number isoparaffin component of the SDF, has been genetically modified such that the fatty acids in the TGFA's extracted from the seeds of the crop are all of the single carbon chain length, preferably C12 or C14. The seed crop is preferably grown in rotation with a food crop such as wheat. After the seed crop 11 is harvested, it is transported, as indicated at 13, to a processing facility 15 wherein the TGFA's contained in the seeds of the crop are isolated from the cellulosic material making up the rest of the plant by conventional techniques, such as crushing and pressing the crop. The cellulosic residue of the seeds and the other cellulosic materials of the plant are then gasified in gasifier 17 by conventional methods to produce syngas as a source of hydrogen for use in the catalytic hydrodeoxygenation and isomerization step performed in reactor 19. The hydrogen content of the syngas can be increased by means of the water-gas shift reaction. Alternatively, some or all of the cellulosic materials obtained from the seed crops 11 can, if suitable, be used as an animal fodder.

In the illustrated embodiment, the single carbon chain length containing TGFA's are converted in the conventional catalytic hydrodeoxygenation and isomerization reactor 19 to a mixture of single carbon atom number isoparaffins, water and propane. The reactor 19 can be either a single stage reactor or, preferably, consist of separate hydrodeoxygenation and isomerization stages. The severity of the hydroprocessing step 19 is controlled to minimize cracking of the TGFA's and to cause the desired degree of isomerization of the product. For SDFs, the severity of the hydroprocessing is limited such that substantially only monomethyl isomers are produced. The single carbon atom number isoparaffin component in the output from the hydroprocessor 19 is separated at 21 from the propane by a flashing technique and from the water by distillation or by other conventional techniques. The isoparaffin component is blended in blender 23 in a controlled proportion with one or more other component isoparaffins having different single carbon atom numbers that are prepared from one or more other genetically modified seed crops in the same manner as described above. A portion of the TGFA's from the processing plant 15 is supplied to the reactor 25 in which a portion of such supplied TGFA's are hydrolyzed to produce a carboxylic acid. The remainder of such supplied TGFA's and the carboxylic acid is blended with the SDFs in blender 23 as the emulsifier and surfactant components of the fully formulated synthetic drilling fluid. If the synthetic fluid being produced by the embodiment illustrated in the FIGURE is to be used as component of a et fuel and stock, the reactor 25 would be eliminated, and all of the fatty acids would be supplied to the reactor 19.

Preferably the TGFA's are first hydrolyzed to isolate the fatty acid chains from the glycerol before being hydroprocessed. The hydroprocessing step can be performed in a single hydrodeoxygenation and isomerization reactor vessel, or the isomerization step can be performed subsequent to the hydrodeoxygenation in a separate reactor vessel.

In an alternative embodiment, the genetically modified TGFA's are heated to the minimum temperature required to cause the TGFA's molecules to decompose into bio char and the corresponding linear alpha olefin analogs of the paraffin chains. The alpha olefins are then processed by well-known linear alpha olefin oligomerization processes to produce fully synthetic bio-derived poly-alpha olefins and other olefinic oligomers that are then saturated by treatment with hydrogen to produce star-shaped isoparaffins for use in SDF's, jet fuel blend stocks, or other petrochemical products, isoparaffin components produced by the above-described TGFA hydroprocessing process can be mixed with isoparaffin components produced by the oligomerization process to produce synthetic fluids having different desired properties.

The process of the invention enables the producer to avoid entirely the need to use petroleum based feeds in the production of SDFs and jet fuel blend stocks, and, with the genetically engineered feeds to control the overall hydrocarbon distribution in the final product. This allows the ultimate chemical and physical properties of the product to be precisely controlled via the crop production chemistry rather than trying to do so via substantially more difficult to control hydroprocessing and oligomerization chemistry.

Another significant aspect of the unique synthetic fluids of the present invention is that their carbon 14 content is substantially higher than that of fluids produced from petroleum based feeds. The fluids produced from petroleum based feedstocks have a carbon 14 content that is typically below limits of detection because the petroleum feedstock from which they are produced has been shielded from the effects of solar radiation for many millennia as a result of its having been present in deep subsurface formations. The carbon 14 content of synthetic fluids produced by the process of the present invention, by contrast, is essentially at typical isotopic content level because the carbon 14 in the seed crop from which such fluids are produced has not had time to decay significantly. This characteristic of the synthetic fluids of the present invention is important because, for example, it can support a certification that the synthetic fluids have been produced by a process of having a low-to-negative GHG emissions.

What is claimed is:

1. A process for producing synthetic fluids comprising the steps of:
   a. providing first and second biological feeds each containing triglyceride fatty adds (TGFA's), said first feed being separate from said second feed, substantially all of the fatty acids in the TGFA's contained in said first feed having a first single carbon atom chain length and substantially all of the fatty acids in the TGFA's contained in said second feed having a second single carbon atom chain length different from said first single carbon atom chain length;
   b. separately cleaving and hydroprocessing the fatty acids in said first and second feeds to produce respective first and second component isoparaffins; and
   c. blending said first and second isoparaffin components together in controlled proportions.

2. The process of claim 1 wherein said first and second component isoparaffins are primarily monomethyl isoparaffins, and said the synthetic fluid is suitable for use as a synthetic drilling base fluid.

3. The process of claim 1 wherein the cleaving and the hydroprocessing of the fatty acids is performed in a simultaneous hydroprocessing step.

4. The process of claim 3 wherein the cleaving and hydroprocessing of the fatty acids comprises the steps of cleaving the fatty acids from the glycerol backbone of the TGFA's, isolating the fatty acids from the glycerol, and hydroprocessing the isolated fatty acids.

5. The process of claim 2 wherein the degrees of hydroprocessing of the fatty acids in the TGFA's in said first and second feeds are limited to minimize the cracking of the fatty acids and paraffins produced therefrom.

6. The process of claim 1 wherein the degrees of hydroprocessing of the TGFA's in said first and second feeds and the ratio of the first and second component isoparaffins in the synthetic fluid are selected such that such fluid meets the requirements for a jet fuel blend stock.

7. The process of claim 1 wherein said first and second feeds are respectively first and second seed crops that have been genetically modified such that substantially all of the fatty acids in the TGFA's contained in the seeds of said first seed crop have said first single carbon atom chain length and substantially all the fatty acids in the TGFA's contained in the seeds of said second seed crop have said second single carbon atom chain length.

8. The process of claim 7 wherein said first single carbon atom chain length is C12 and said second single carbon atom chain length is C14.

9. The process of claim 7 wherein said first and second seed crops comprise camelina.

10. The process of claim 7 wherein said seed crops are planted in rotation with a food crop.

11. A process for producing synthetic fluids comprising the steps of:
    a. providing first and second biological feeds each containing triglyceride fatty adds (TGFA's), said first feed being separate from said second feed, substantially all of the fatty acids in the TGFA's contained in said first feed having a first single carbon atom chain length and substantially all of the fatty acids in the TGFA's contained in said second feed having a second single carbon atom chain length different from said first single carbon atom chain length;
    b. separately heating said first and second feeds to substantially the minimum respective temperatures that are sufficient to cause the TGFA's in the respective feeds to decompose into bio char and the corresponding linear alpha olefins;
    c. oligomerizing said linear alpha olefins to produce poly-alpha olefins and other olefinic oligomers; and
    d. saturating said poly-alpha olefins by treatment with hydrogen.

12. A synthetic drilling fluid base stock consisting of:
    a. a first isoparaffin component, substantially all of the molecules of said first isoparaffin component containing a single first number of carbon atoms; and
    b. a second isoparaffin component, substantially all of the molecules of said second isoparaffin component containing a single second number of carbon atoms that is different from said first number of carbon atoms;

wherein said first and second Isoparaffin components are prepared by separately cleaving and hydroprocessing the fatty acids contained in respective separate first and second triglyceride fatty acid (TGFA) containing seed crops, substantially all of the fatty acids in the TGFA's contained in said first seed crop having a first single carbon atom chain length and substantially all of the fatty acids in the TGFA's contained in said second seed crop having a second single carbon atom chain length different from said first single carbon atom chain length; the severities of the hydrotreatment of the fatty adds in the TGFA's contained in said first and second seed crops having been separately controlled such that the degree of cracking of such fatty adds is substantially minimized and the isomers generated are primarily monomethyl isoparaffins and said first and second isoparaffin components are blended together after hydroprocessing in a controlled ratio.

13. The synthetic fluid of claim 12 wherein said first and second isoparaffin components consist essentially of monomethyl isoparaffins.

14. The synthetic fluid of claim 12 wherein said first and second numbers are integers between 12 and 14 inclusive.

15. A drilling fluid comprising the synthetic drilling fluid base stock of claim 12.

16. A synthetic aviation fuel blend stock consisting of:
a. a first isoparaffin component, substantially all of the molecules of said first isoparaffin component containing a single first number of carbon atoms; and
b. a second isoparaffin component, substantially all of the molecules of said second isoparaffin component containing a single second number of carbon atoms that is different from said first number of carbon atoms;

wherein said first and second Isoparaffin components are prepared by separately cleaving and hydroprocessing the fatty acids contained in respective separate first and second triglyceride fatty add (TGFA) containing seed crops, substantially all of the fatty acids in the TGFA's contained in said first seed crop having a first single carbon atom chain length and substantially all of the fatty acids in the TGFA's contained in said second seed crop having a second single carbon atom chain length different from said first single carbon atom chain length; the severities of the hydrotreatment of the fatty adds in the TGFA's contained in said first and second seed crops having been separately controlled such that they are substantially the minimum required to generate sufficient multiple branched isomers to obtain a freeze point each of said isoparaffin components of less than $-47°$ C and the degree of cracking of such fatty adds is substantially minimized.

17. An aviation fuel comprising the synthetic aviation fuel blend stock of claim 16.

18. The synthetic aviation fuel blend stock of claim 17 wherein the ratio of said first and second isoparaffin components in the blend stock is selected such that the properties of the blend stock meets the requirements specified in ASTM 7566.

* * * * *